(12) United States Patent
Williams

(10) Patent No.: US 8,280,670 B2
(45) Date of Patent: Oct. 2, 2012

(54) METHOD AND APPARATUS FOR DETECTING FAILURE OF AN ACTUATOR SWITCHING DEVICE

(75) Inventor: Craig B. Williams, Louisville, KY (US)

(73) Assignee: General Electric Company, Schenectady, NY (US)

( * ) Notice: Subject to any disclaimer, the term of this patent is extended or adjusted under 35 U.S.C. 154(b) by 436 days.

(21) Appl. No.: 12/582,670

(22) Filed: Oct. 20, 2009

(65) Prior Publication Data

US 2011/0093234 A1  Apr. 21, 2011

(51) Int. Cl.
*G06F 19/00* (2011.01)

(52) U.S. Cl. ........... 702/115; 361/42; 361/44; 324/72.5; 340/638; 340/639

(58) Field of Classification Search .............. 702/115; 340/657, 639, 638; 361/42, 44, 45, 46, 115; 335/18, 132, 202; 324/72.5, 750.3, 418, 324/536, 509
See application file for complete search history.

(56) References Cited

U.S. PATENT DOCUMENTS

| | | | |
|---|---|---|---|
| 4,628,268 A * | 12/1986 | Matsubara | 324/418 |
| 6,437,953 B2 * | 8/2002 | DiSalvo et al. | 361/42 |
| 6,621,388 B1 | 9/2003 | MacBeth | |
| 6,784,770 B2 * | 8/2004 | Gimenez et al. | 335/18 |
| 6,807,035 B1 | 10/2004 | Baldwin et al. | |
| 6,812,685 B2 * | 11/2004 | Steber et al. | 324/72.5 |
| 6,960,916 B2 * | 11/2005 | Walker | 324/509 |
| 7,149,065 B2 | 12/2006 | Baldwin et al. | |
| 7,167,349 B2 * | 1/2007 | Asano et al. | 361/42 |
| 7,215,521 B2 | 5/2007 | Bernstein | |
| 7,295,415 B2 | 11/2007 | Huang et al. | |
| 7,372,678 B2 | 5/2008 | DiSalvo et al. | |
| 7,400,479 B2 | 7/2008 | DiSalvo | |
| 2002/0135349 A1 * | 9/2002 | Steber et al. | 324/72.5 |
| 2005/0110501 A1 * | 5/2005 | Walker | 324/536 |
| 2010/0060468 A1 * | 3/2010 | Elms et al. | 340/638 |
| 2010/0060469 A1 * | 3/2010 | Hetzmannseder et al. | 340/639 |

* cited by examiner

*Primary Examiner* — Carol Tsai
(74) *Attorney, Agent, or Firm* — Global Patent Operation; Stephen G. Midgley

(57) ABSTRACT

A circuit breaker includes an actuator, a switching device connected to the actuator, and a test unit configured to test a connection between the actuator and the switching device by detecting a first connection voltage at the connection between the actuator and the switching device. The test unit is further configured to test the operation of the switching device by turning the switching device on without operating the actuator.

14 Claims, 11 Drawing Sheets

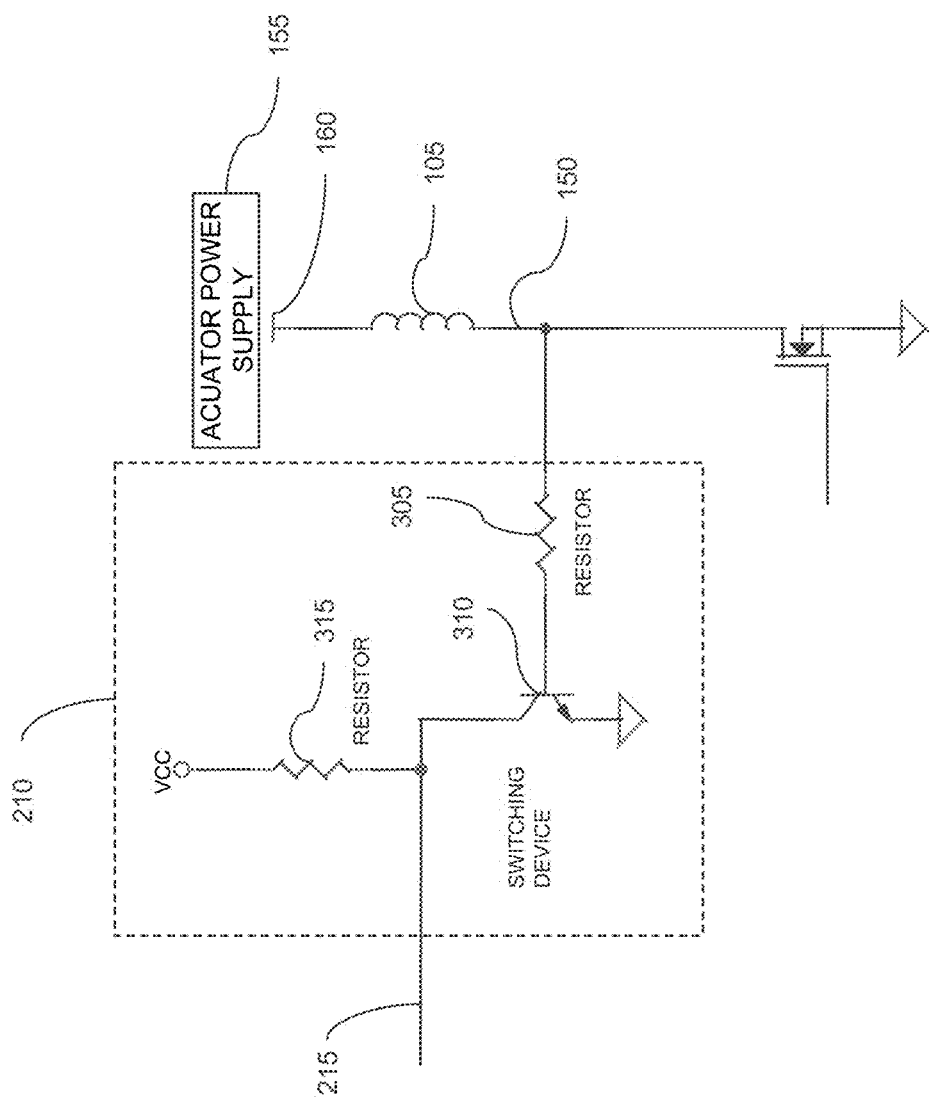

METHOD AND APPARATUS FOR DETECTING FAILURE OF AN ACTUATOR SWITCHING DEVICE

The subject matter described herein relates generally to actuators, for example, circuit breaker actuators, and, more particularly, to detecting a failure of an actuator switching device.

BACKGROUND

Electronic trip units within circuit breakers for alternating and direct current distribution circuits are commonly used for protection against dangerous shocks due to line-to-ground current flow through the human body. These electronic trip units include, for example, ground fault circuit interrupters (GFCI) that sense a current imbalance between the phase and neutral conductors of the circuit breakers, arc fault interrupters, and overcurrent protection interrupters. The electronic trip units typically use a switching device to operate an actuator to trip or open the circuit to prevent a serious electrical shock or electrocution.

Electronic trip units may be tested to ensure proper operation, however, some failures of the switching device may occur that may render the circuit breaker inoperable without any indication. For example, an electronic trip unit may provide a trip signal to a switching device, for example, a transistor or SCR, which in turn energizes the actuator to cause the circuit breaker to trip. The circuit breaker circuitry is usually configured so that if the switching device fails shorted, the actuator is energized, the circuit breaker will trip, and the failure thereby detected. However, in this configuration, if the switching device fails open, the actuator cannot be energized, and the circuit breaker cannot be tripped automatically. Furthermore, if the actuator becomes electrically disconnected from the switching device, the actuator also cannot be energized and the circuit breaker cannot be automatically tripped. Presently, there are no techniques to detect this type of failure without removing the circuit breaker from service to be tested.

Accordingly, there is a need for automatically monitoring a circuit breaker to detect proper fault detection and to provide an indicator in the event of improper operation of the electronic fault protection.

SUMMARY

In accordance with another exemplary embodiment, a circuit breaker includes an actuator, a switching device connected to the actuator, and a test unit configured to test a connection between the actuator and the switching device by detecting a first connection voltage at the connection between the actuator and the switching device. The test unit is further configured to test the operation of the switching device by turning the switching device on without operating the actuator.

In accordance with yet another exemplary embodiment, a method is provided for self testing a circuit breaker having an actuator and a switching device connected to the actuator. The method includes testing a connection between the actuator and the switching device by detecting a first connection voltage at the connection between the actuator and the switching device, and testing the operation of the switching device by turning the switching device on without operating the actuator.

BRIEF DESCRIPTION OF THE DRAWINGS

The following detailed description is made with reference to the accompanying drawings, in which:

FIGS. 3A and 3B show exemplary embodiments of circuitry within the test unit;

DETAILED DESCRIPTION

Figure 1:
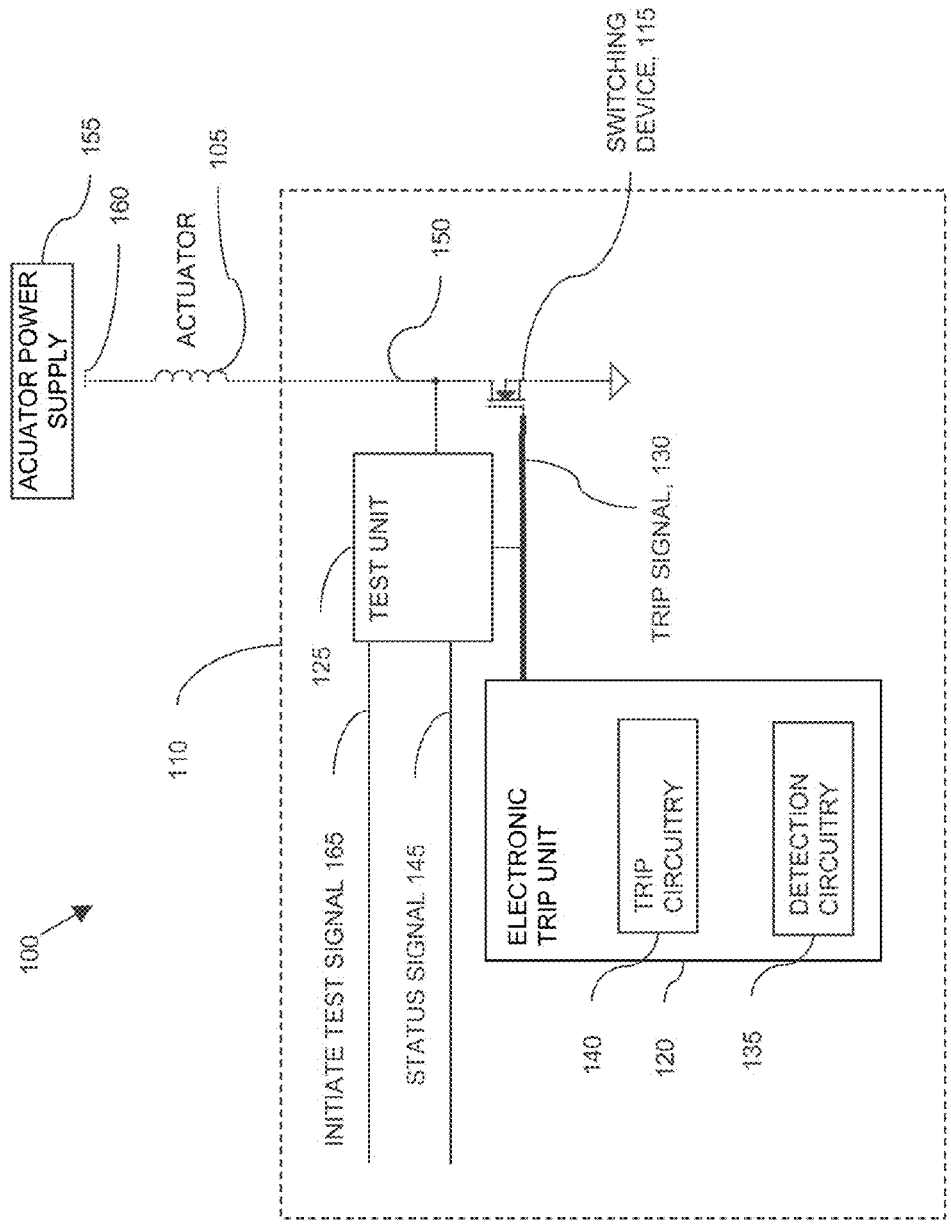
FIG. 1 shows a schematic illustration of an exemplary circuit breaker in accordance with the disclosed embodiments.

FIG. 1 shows a schematic illustration of an exemplary circuit breaker 100 in accordance with the disclosed embodiments. It should be understood that the circuit breaker 100 shown in FIG. 1 is for exemplary purposes only and that in alternate embodiments the circuit breaker 100 may include any suitable components for causing the operation of the circuit breaker 100 in accordance with the exemplary embodiments. The circuit breaker 100 may be any suitable type of circuit breaker 100 capable of handling any suitable voltage and/or current loads. Although the embodiments disclosed will be described with reference to the drawings, it should be understood that the embodiments disclosed may be embodied in many alternate forms. In addition, any suitable size, shape or type of elements or materials could be used.

The circuit breaker 100 includes an actuator 105 that may operate to force the circuit breaker contacts (not shown) together or apart for effecting the flow of current through the circuit breaker 100. Actuator 105 may be connected to an actuator power supply 155 and may be energized by a circuit breaker trip circuit 110. Actuator 105 may be a solenoid, actuator, flux shifter or any electromechanical device suitable for forcing circuit breaker contacts together or apart. Actuator power supply 155 provides an actuator supply voltage 160. Circuit breaker trip circuit 110 may include a switching device 115, an electronic trip unit 120 and a test unit 125. The actuator 105 may be connected directly to and energized by switching device 115. While the switching device 115 is shown as a single device, for example a transistor or SCR, it should be understood that the switching device 115 may include any suitable switch or switching circuitry for energizing the actuator 105 so long as the switching device may be switched between an "on" state and an "off" state before energizing the actuator. Electronic trip unit 120 may monitor an electrical power source (not shown) for arc faults, ground faults, overcurrent faults, or any other suitable fault condition and in response to detecting a fault, may operate to provide a trip signal 130 to switching device 115. The electronic trip unit 120 generally includes detection circuitry 135 and trip circuitry 140. The detection circuitry 135 may be configured to detect any suitable fault related to the electrical power source, for example, a ground fault, arc fault, overcurrent fault, etc. The trip circuitry 140 generally includes circuitry for responding to detection of a fault by the detection circuitry 135 and for providing the trip signal 130 to drive the switching device 115.

Electronic trip unit 120, detection circuitry 135, and trip circuitry 140 may generally include any circuitry or programs for detecting faults and for providing the trip signal 130, including one or more processors, field programmable gate arrays, programmable logic devices, gate array logic devices, state machines, and memory devices. The memory devices may include computer readable or usable media and computer readable or usable storage media encoded with computer executable components, software, programs, instructions, commands, etc. for implementing the embodiments disclosed herein. Electronic trip unit 120, detection circuitry 135 and trip circuitry 140 may also include any suitable sensors, digital signal processors, buffers, analog to digital and digital to analog converters, level shifters, amplifiers, rectifiers, or any other suitable electrical components for detecting faults and for providing the trip signal 130.

Test unit 125 may be configured to perform an automatic test of the connection 150 between the actuator 105 and the switching device 115 as well as an automatic test of the switching device 115 itself. In some embodiments, an initiate test signal 165 may cause test unit to perform the tests described herein. The initiate test signal 165 may be supplied by another device (not shown), for example, an automatic testing device, or a user actuated switch. The test unit 125 operates to sense a voltage at the connection 150 between the actuator 105 and the switching device 115 and determine if the actuator 105 is connected to the switching device 115. The test unit 125 also operates to provide the trip signal 130 and verify that the voltage at the connection 150 between the actuator 105 and the switching device 115 changes in response without energizing actuator 105. The test unit 125 may generate a status signal 145 indicative of an operational status of the connection 150 between the actuator 105 and the switching device 115 and of the operational status of the switching device 115. The operational status may include whether one or both of the connection 150 and switching device 115 are functional, that is, operative, working, or usable. The operational status may also include whether one or both of the connection 150 and switching device 115 are faulty, that is, defective, not working, or malfunctioning.

Figure 2:
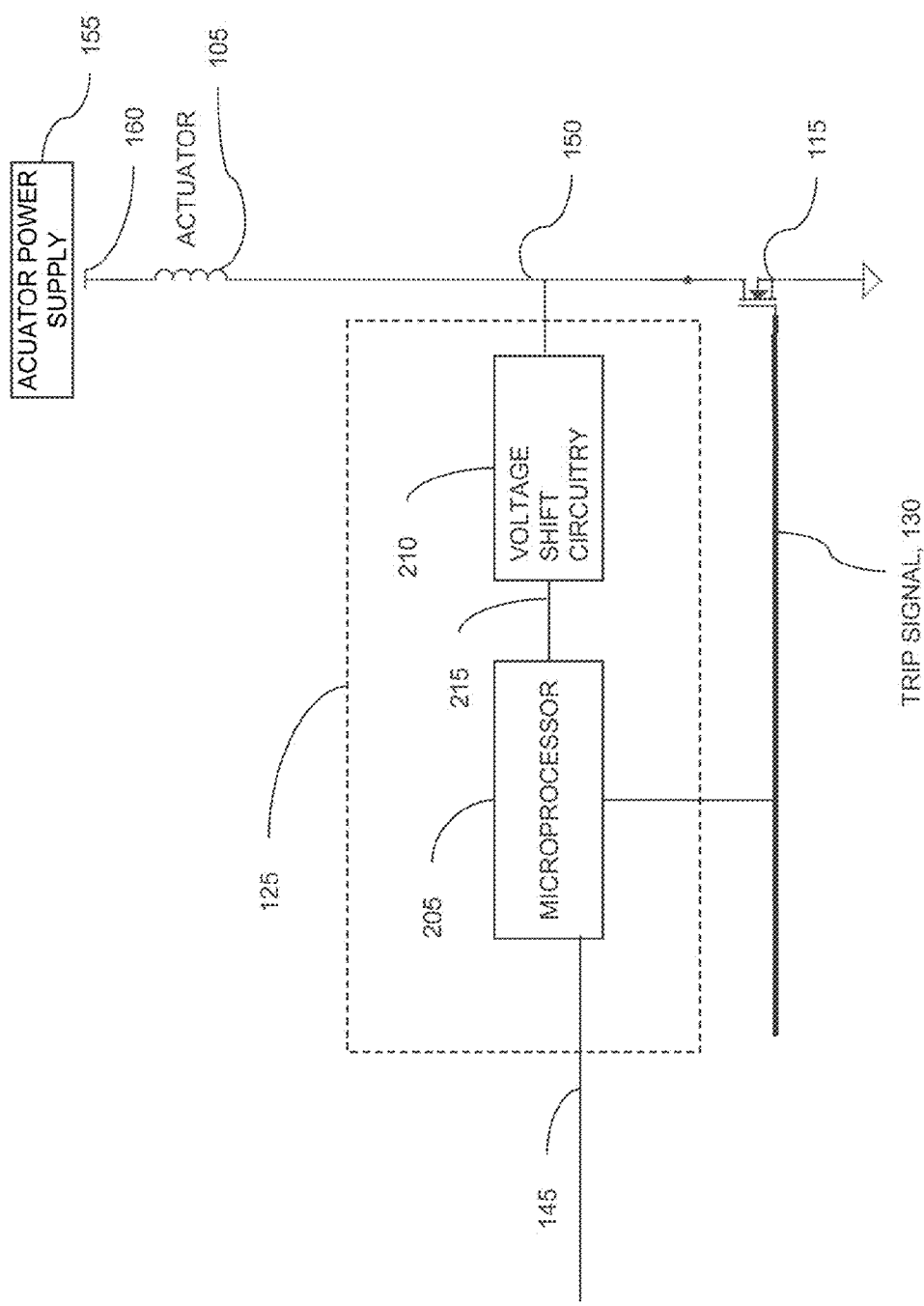
FIG. 2 shows a block diagram of an exemplary embodiment of a test unit for the circuit breaker.

FIG. 2 shows an exemplary block diagram of an embodiment of the test unit 125, where the test unit includes a microprocessor 205 and optional voltage shift circuitry 210. The voltage shift circuitry 210 is connected to connection 150. In embodiments where the voltage at connection 150 is incompatible with inputs of the microprocessor 205, the voltage shift circuitry 210 operates to scale the voltage to a range that is compatible or readable by the microprocessor 205 and provide a compatible output signal 215. The microprocessor 205 may generally include any circuitry or programs for reading or sensing the compatible output signal 215 and for providing the status signal 145, including additional processors and memory devices where appropriate. The memory devices may include computer readable or usable media and computer readable or usable storage media encoded with computer executable components, software, programs, instructions, commands, etc. for implementing the embodiments disclosed herein. The microprocessor 205 and voltage shift circuitry 210 may also include any suitable sensors, digital signal processors, buffers, analog to digital and digital to analog converters, level shifters, amplifiers, rectifiers, or any other suitable electrical components for conditioning the voltage at connection 150, providing the compatible output signal 215, detecting faults from the compatible output signal 215 and for providing the status signal 145.

Figure 3B:
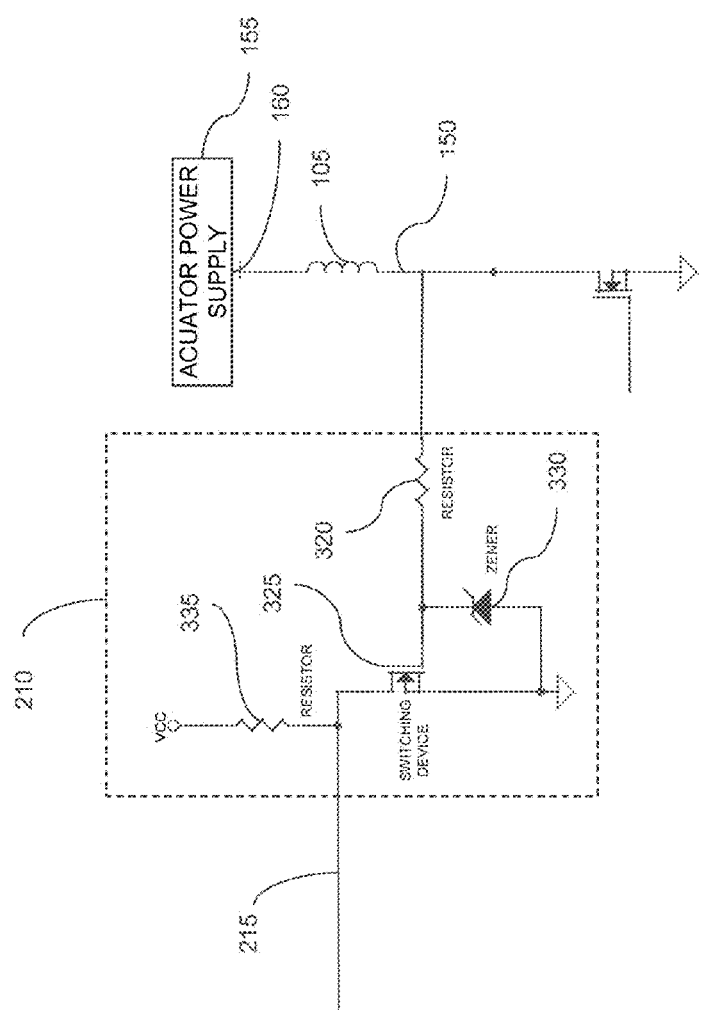

FIGS. 3A and 3B show exemplary embodiments of the voltage shift circuitry 210. In FIG. 3A, the voltage at connection 150 is scaled by a combination of resistor 305, NPN transistor 310, resistor 315, and voltage VCC to a level readable by the microprocessor 205. FIG. 3B shows an alternative embodiment where the voltage at connection 150 is scaled by a combination of resistor 320, MOSFET 325, zener diode 330, resistor 335, and voltage VCC. In both embodiments, the components are chosen so that the current drawn by voltage shift circuitry 210 does not reach the operating current of the actuator 105 within a safety margin.

Figure 4A:
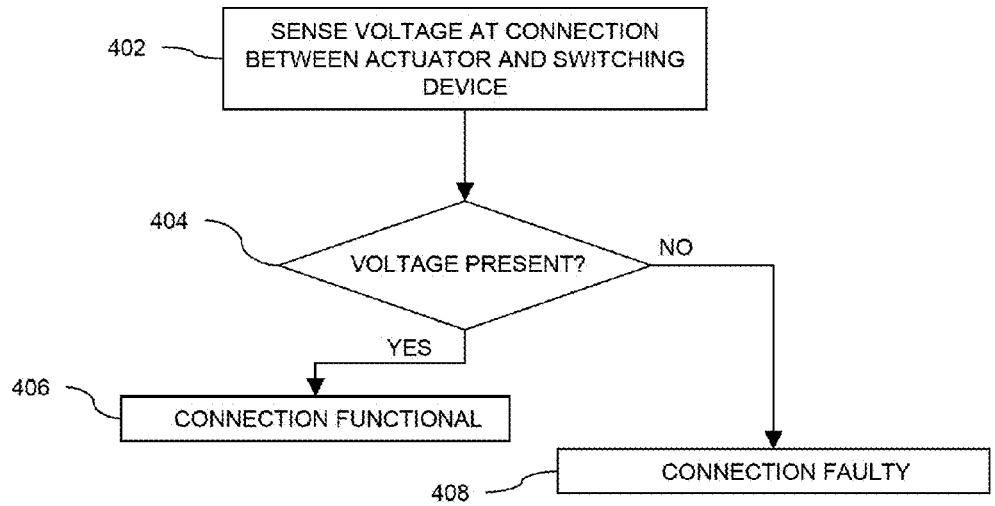
FIGS. 4A through 4F depict flow diagrams of exemplary operations of the test unit.

FIG. 4A depicts a flow diagram of an exemplary operation of test unit 125. In the disclosed embodiments, during normal operation, that is, when the circuit breaker 100 is in the untripped state, the voltage at connection 150 will approach the voltage of the actuator power supply 155. As described above, voltage shift circuitry 210 may operate to scale the voltage at connection 150 to a level readable by the microprocessor 205.

Referring to block 402 of FIG. 4A, the microprocessor 205 may operate to check connection 150 by sensing a voltage at connection 150 directly or through optional voltage shift circuitry 210. Referring to block 404, if a voltage is present, the connection 150 may be functional as shown in block 406. If no voltage is present, the connection 150 may be faulty as shown in block 408.

Figure 4B:
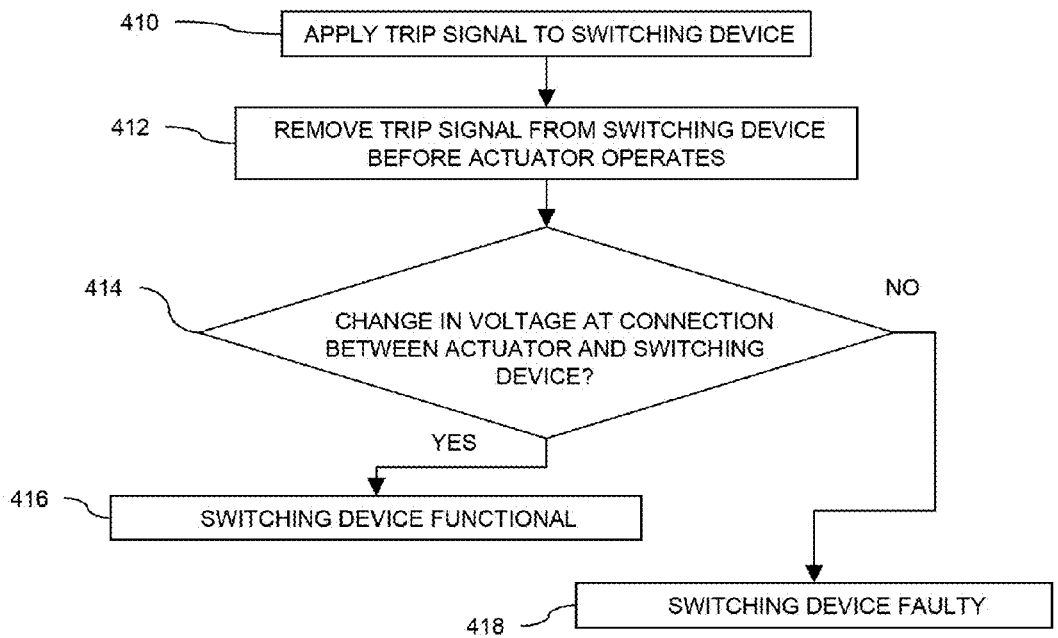

FIG. 4B depicts a flow diagram of another exemplary operation of test unit 125. Test unit 125 may check the operation of switching device 115 by turning switching device 115 on and off without energizing actuator 105. Microprocessor 205 may apply trip signal 130 to switching device 115 as shown in block 410. Microprocessor 205 may then remove trip signal 130 from switching device 115 before actuator 105 operates as shown in block 412. Referring to block 414, microprocessor 205 may determine whether a change in voltage occurs at the connection 150 between actuator 105 and switching device 115 between the time the trip signal 130 was applied and removed. A change in voltage may signify that switching device 115 is functional as shown in block 416, while no change in voltage may indicate that switching device 115 is faulty as shown in block 418.

Figure 4C:
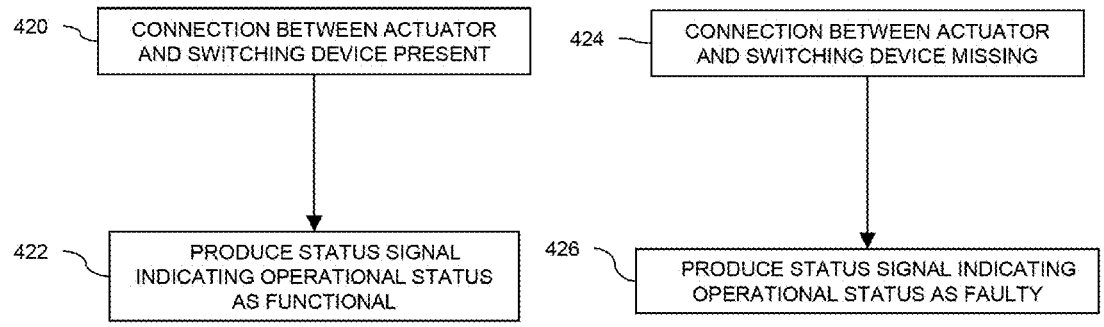
Figure 4D:
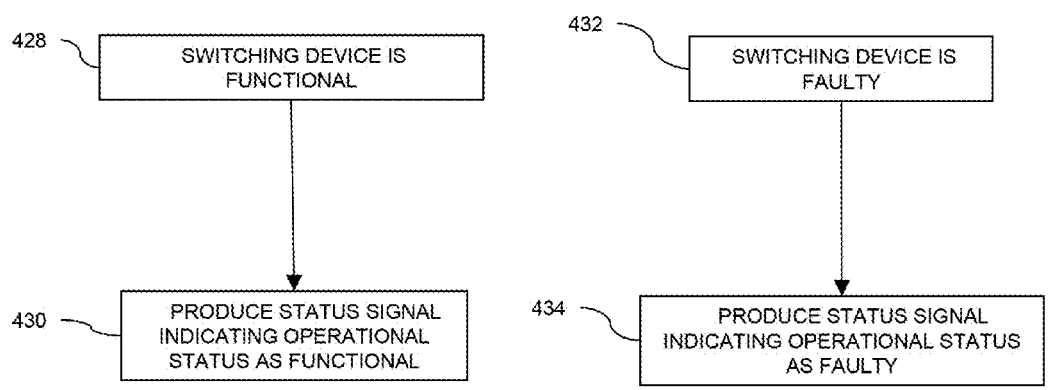

FIGS. 4C and 4D show further exemplary operations of test unit 125. As shown in blocks 420 and 422, in the case where connection 150 may be present, the test unit may produce status signal 145 in a manner indicating that the operational status of connection 150 is functional. As shown in blocks 424 and 426, in the case where connection 150 may be faulty, the test unit 125 may produce status signal 145 in a manner indicating that the operational status of the connection between the actuator 105 and the switching device 115 is faulty. As shown in blocks 428 and 430, in the case where switching device 115 may be functional, the test unit may produce status signal 145 in a manner indicating that the operational status of switching device 115 is functional. As shown in blocks 432 and 434, in the case where switching device 115 may be faulty, the test unit may produce status signal 145 in a manner indicating that the operational status of switching device 115 is faulty.

In additional embodiments, the microprocessor 205 of test unit 125 may be capable of measuring, or may be preprogrammed with, the actuator supply voltage 160, also referred to as $V_{actuator\ supply}$. The microprocessor may determine a first threshold voltage $V_{first\ threshold}$ that represents an approximate minimum of a voltage range that may be present at connection 150 when actuator 105 is connected to actuator power supply 155 and connection 150, and switching device 115 is off or open. The first threshold voltage $V_{first\ threshold}$ may be determined from the actuator supply voltage $V_{160}$ and any combination of any voltage drop across actuator 105, any voltage drop across connection 150, and any other factors that may affect the actuator supply voltage 160 as measured at connection 150. Parameters for the voltage drops and other factors as well as any formulas or calculations used to determine the first threshold voltage $V_{first\ threshold}$ may be preprogrammed into the microprocessor 205. In some embodiments $V_{first\ threshold}$ itself may be preprogrammed into the microprocessor 205.

Figure 4E:
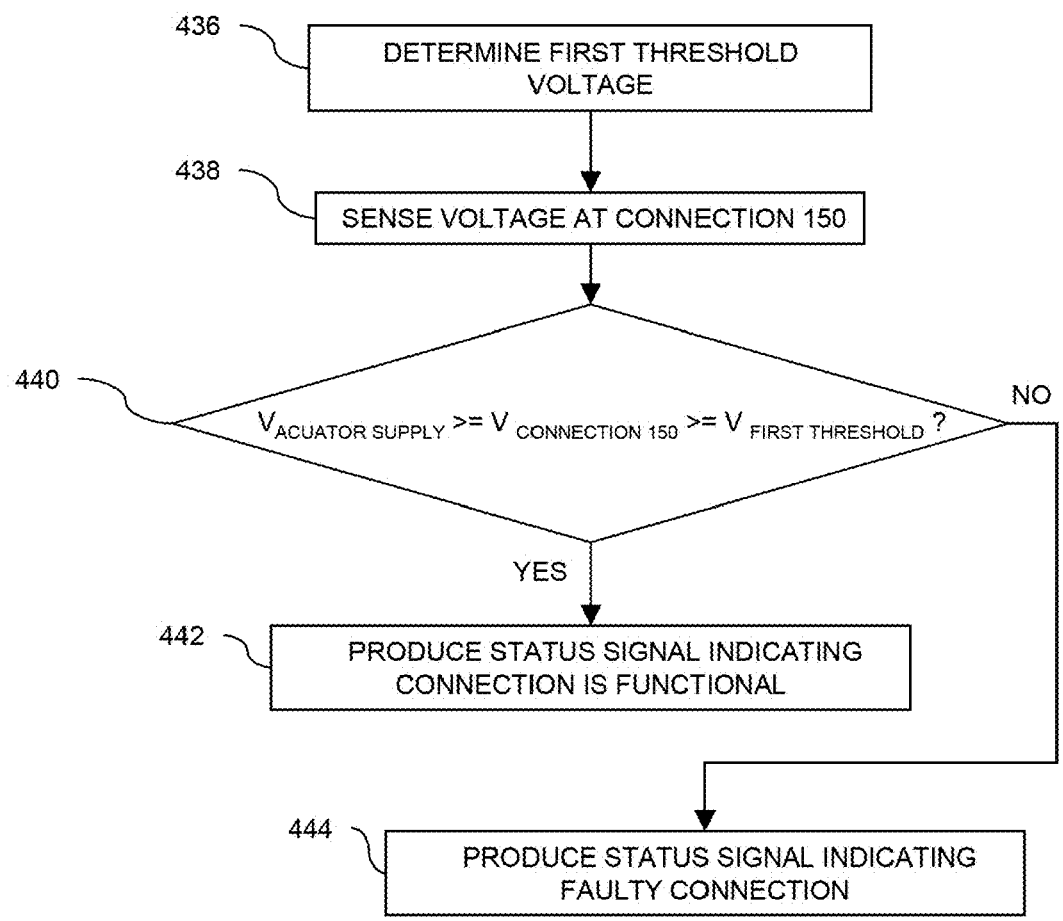
Figure 4F:
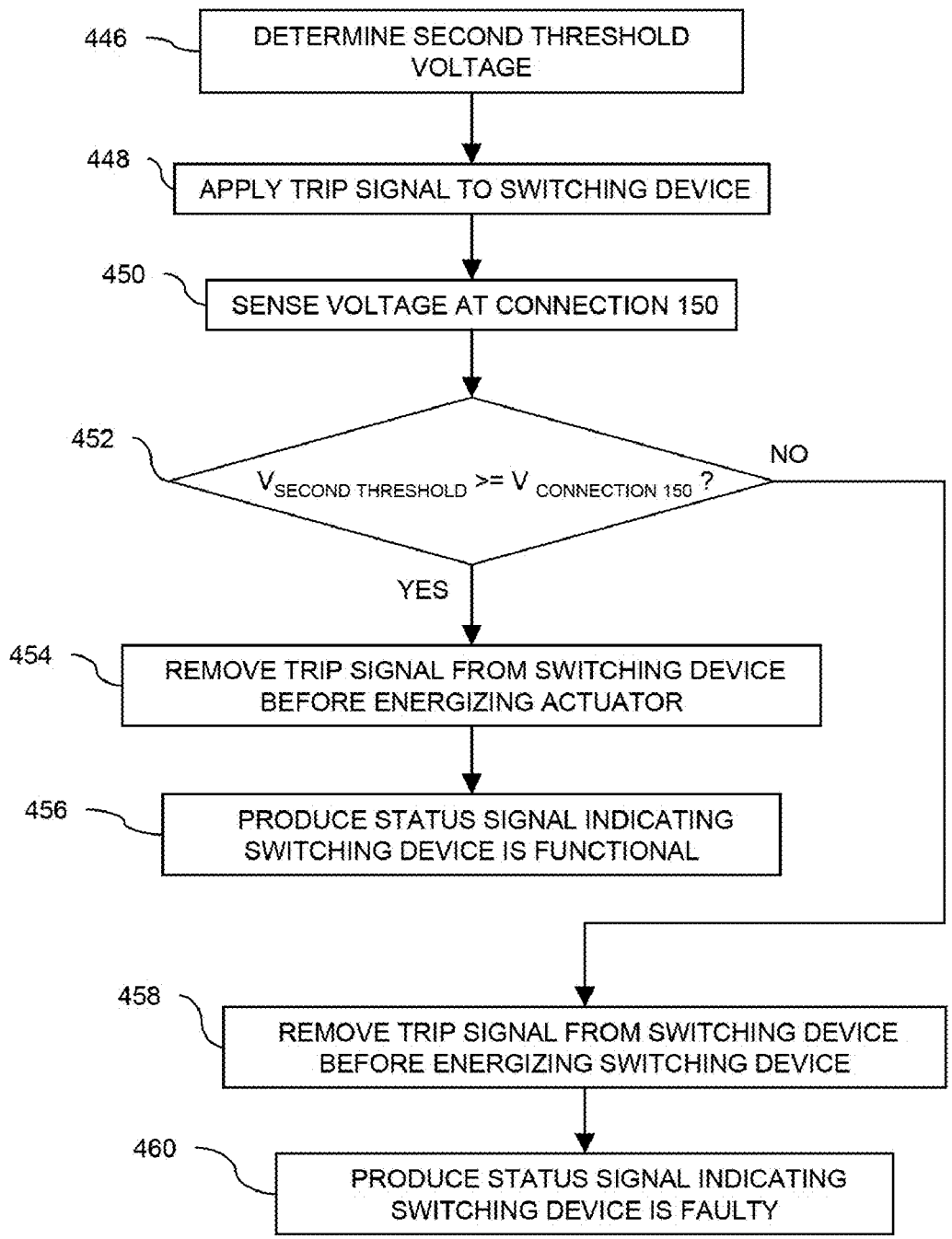

FIGS. 4E and 4F show flow diagrams of further exemplary operations of test unit 125. Referring to FIG. 4E, the microprocessor 205 may operate to determine the first threshold voltage $V_{first\ threshold}$ as described above and as shown in block 436. The microprocessor 205 may sense the voltage at connection 150 directly or through optional voltage shift circuitry 210 as shown in block 438. Then, as shown in block 440, the microprocessor 205 determines if the voltage at connection 150 is greater than or equal to actuator supply voltage $V_{actuator\ supply}$, and less than or equal to the first threshold voltage. If the voltage at connection 150 satisfies these conditions, the microprocessor 205 may operate to produce status signal 145 in a manner that indicates that the connection between the actuator 105 and the switching device 115 is functional as shown in block 442. If the voltage at connection 150 does not satisfy these conditions, the microprocessor 205 may operate to produce status signal 145 in a manner that indicates that the connection between the actuator 105 and the switching device 115 is faulty as shown in block 444.

In the disclosed embodiments, the response time of actuator 105 is generally slower that that of the switching device 115 and thus switching device 115 may be closed and re-opened in less time than that required to energize the actuator 105. In other words, the switching device 115 may be closed and re-opened before the actuator 105 reacts to the closing of the switching device 115. Thus, operation of the switching device 115 may be verified without operating the actuator 105 and tripping the circuit breaker 100.

As mentioned above, the microprocessor 205 of test unit 125 may be capable of measuring, or may be preprogrammed with the actuator supply voltage 160. The microprocessor may operate to determine a second threshold voltage $V_{second\ threshold}$ that represents an approximate maximum of a voltage range that may be present at connection 150 when switching device 115 is on or closed. The second threshold voltage $V_{second\ threshold}$ may be determined from the actuator supply voltage $V_{160}$ and any combination of any voltage drop across actuator 105, any voltage drop across connection 150, any voltage drop across switching device 115, and any other factors that may affect the voltage present at connection 150 when switching device 115 is on or closed. Parameters for the voltage drops and other factors as well as any formulas or calculations used to determine the second threshold voltage $V_{second\ threshold}$ may be preprogrammed into the microprocessor 205. In some embodiments $V_{second\ threshold}$ itself may be preprogrammed into the microprocessor 205.

Referring to block 436 of FIG. 4E, the microprocessor 205 may operate to determine the second threshold voltage $V_{second\ threshold}$ as described above. The microprocessor 205 may operate to apply the trip signal 130 to switching device 115 as shown in block 448 causing the switching device to turn on or close, and thus conduct current. The microprocessor 205 may also operate to sense the voltage at connection 150 as shown in block 450 and compare the second threshold voltage $V_{second\ threshold}$ with the voltage at connection 150 as shown in block 452. If the voltage at connection 150 is equal to or less than the second threshold voltage $V_{second\ threshold}$, the microprocessor 205 removes the trip signal 130 from the switching device 115 before energizing actuator 105, as shown in block 454 and produces status signal 145 to indicate that the switching device is functional as shown in block 456. If the voltage at connection 150 is not equal to or less than the second threshold voltage $V_{second\ threshold}$, the microprocessor 205 removes the trip signal 130 from the switching device 115 before energizing actuator 105, as shown in block 458 and produces status signal 145 to indicate that the switching device 115 is faulty as shown in block 460.

Figure 5:
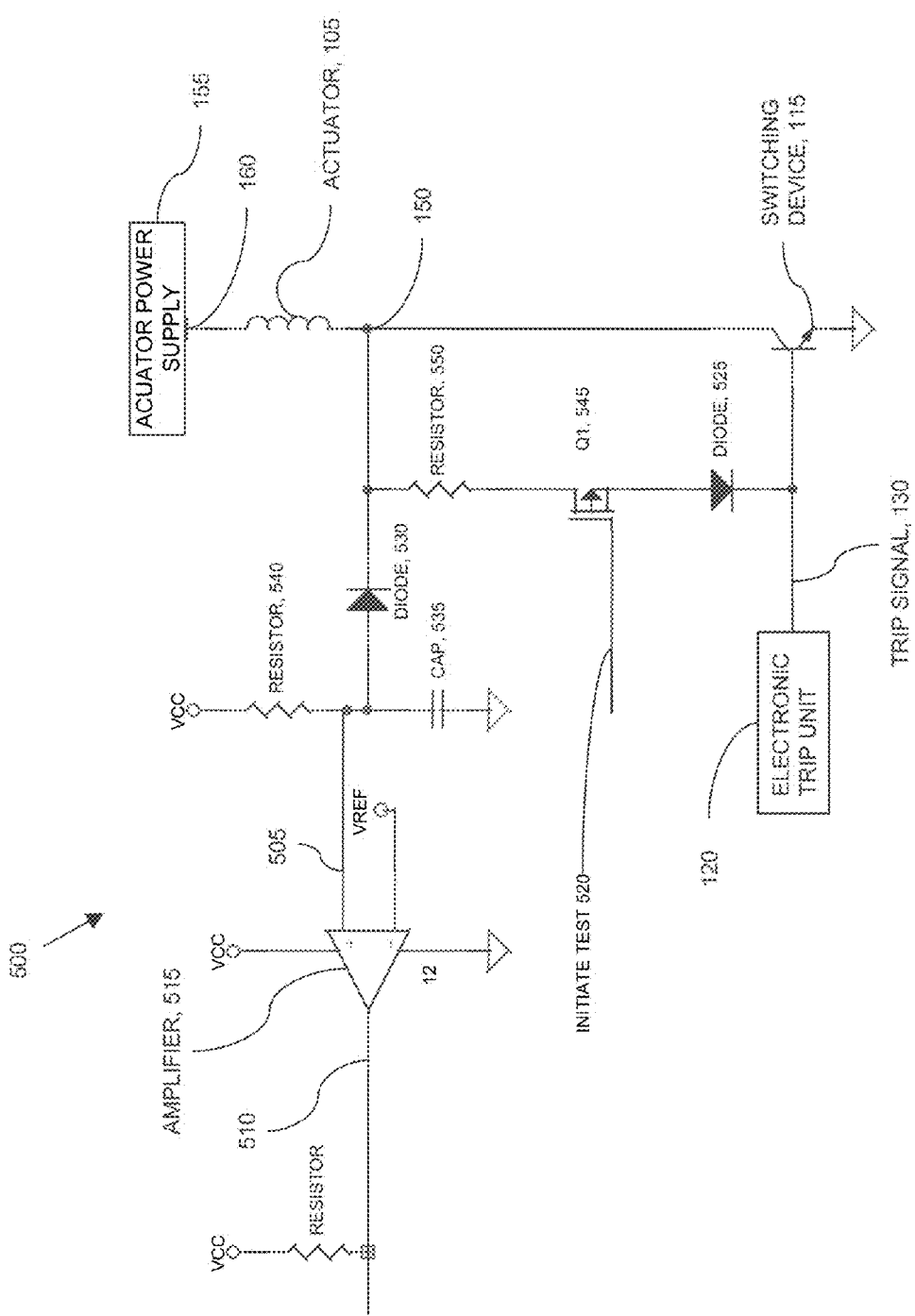
FIG. 5 shows another exemplary embodiment of a test unit.

FIG. 5 shows another embodiment of a test unit 500 implemented without programmable or clocking devices. During normal operation, when the circuit breaker 100 is in the untripped state and there is no initiate test signal 520, the voltage at connection 150 will approach the voltage of the actuator power supply 155 causing the voltage at node 505 to approach $V_{CC}$. As the voltage at node 505 exceeds $V_{REF}$, the output 510 of amplifier 515 also approaches $V_{CC}$, indicating that connection 150 is functional.

In other operations, the initiate test signal 520 is applied to switching device Q1 545 by another device (not shown), for example, an automatic testing device, or a user actuated switch. With switching device Q1 "on," or conducting, current passes through resistor 550, Q1 545, and diode 525, to switching device 115, turning switching device 115 "on." With switching device 115 "on" and thereby conducting current, the voltage at connection 150 is pulled to a "low" state determined by the voltage drop across actuator 105 and across switching device 115. This in turn causes node 505 to be pulled "low" through diode 530, discharging capacitor 535 and causing the output 510 of amplifier 515 to be pulled "low" indicating that switching device 115 has been turned "on".

The switching device 115 will turn "off" when the initiate test signal 520 is removed or the voltage at connection 150 is pulled "low" removing the current through resistor 550, Q1 545, and diode 525, to switching device 115.

In another mode of operation, the initiate test signal 520 is applied on a periodic basis, causing the voltage at node 505 to remain low according to the time constant of resistor 540 and capacitor 535, where $V_{505}=V_{CC}*e^{-t/(R540*C535)}$. If the switching device 115 fails, the voltage at node 505 will exceed $V_{REF}$ causing the output of amplifier to be pulled "high" indicating a failure of switching device 115.

Figure 6:
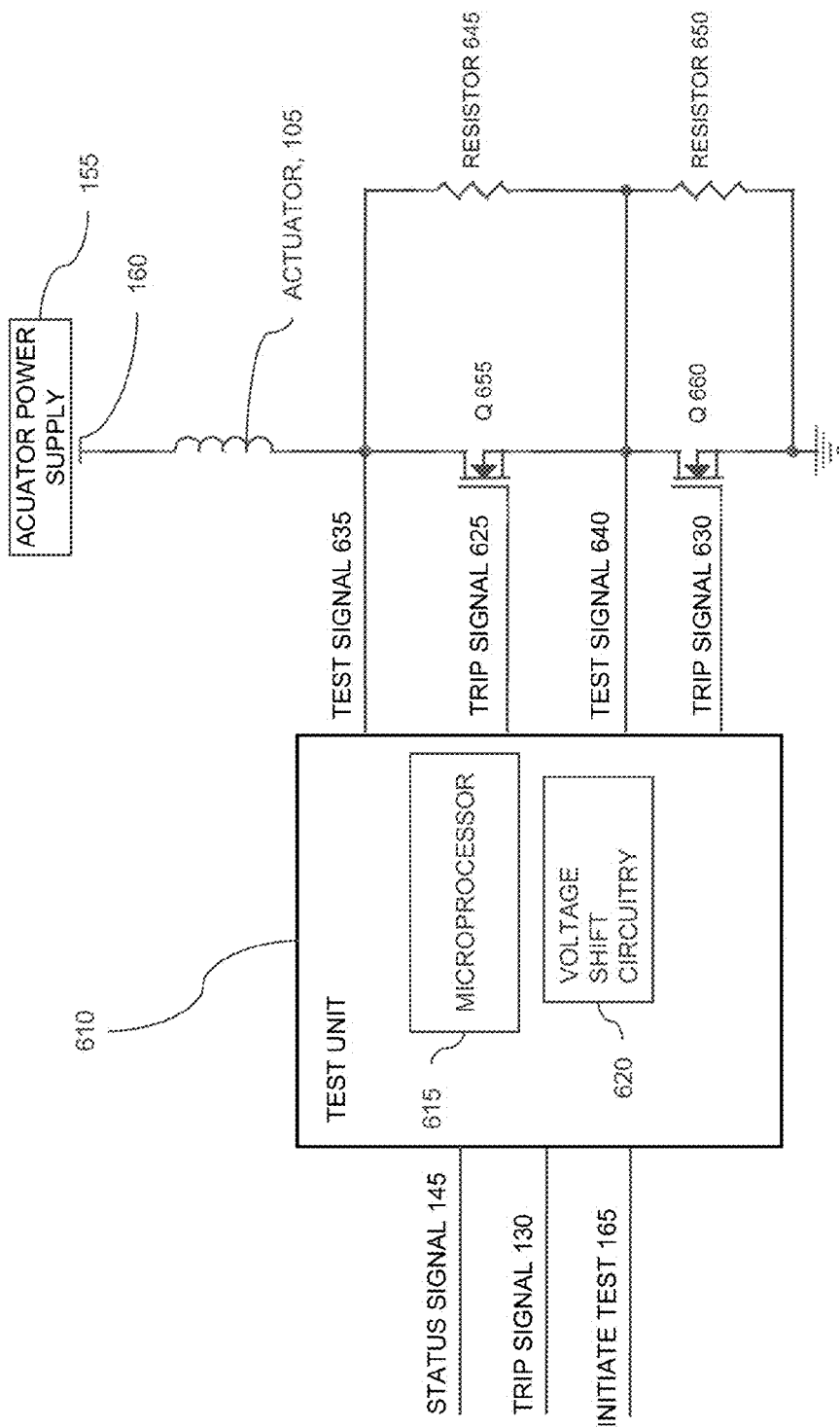
FIGS. 6 and 7 show additional embodiments of a test unit according to the disclosed embodiments.

FIG. 6 shows yet another embodiment of a test unit 610 and supporting circuitry for providing both a testing facility and actuator operation. Test unit 610 may include a microprocessor 615 and voltage shift circuitry 620, as in the embodiments disclosed above, including any circuitry, components, additional processors, and memory devices with computer readable or usable media and computer readable or usable storage media encoded with computer executable components, software, programs, instructions, commands, etc. for implementing the embodiments disclosed herein. Test unit 610 may be configured to perform tests automatically or in response to the initiate test signal 165 described above. The values of resistor 645 and resistor 650 may be selected such that the current through any one of resistor 645 and resistor 650 is not sufficient to cause actuation of actuator 105. Q655 and Q660 may comprise any switch, switching device, or switching circuitry suitable for energizing the actuator 105.

When the test unit 610 has not been enabled for testing, the test unit may operate to turn on both Q655 and Q660 in response to the trip signal 130, actuating the actuator 105 and causing the circuit breaker to trip. For testing the circuit breaker, test unit 610 may generally operate to provide trip signal 625 and trip signal 630 and to read or sense test signal 635 and test signal 640. The connection to the actuator 105 may be tested by providing trip signal 625 to cause Q655 to conduct or "turn on" and providing trip signal 630 to cause Q660 to open or "turn off" and sensing test signal 640. A voltage at test signal 640 that is substantially equal to the voltage of the actuator power supply 155 indicates that the connection is present and Q655 and Q660 are operating properly. A voltage at test signal 640 that is substantially equal to ½ the voltage of the actuator power supply 155 indicates that the connection is present and Q655 may be malfunctioning. A voltage at test signal 640 of substantially 0 volts indicates that Q660 may be shorted. Under these conditions, the solenoid may actuate, tripping the circuit breaker.

Further operations of Q655 and Q660 may be tested by providing trip signal 625 to cause Q655 to open or "turn off" and providing trip signal 630 to cause Q660 to close or "turn on" and sensing test signal 640. A voltage at test signal 640 that is substantially equal to 0 volts or ground indicates that Q655 and Q660 may be operating properly. A voltage at test signal 640 that does not substantially equal 0 volts or ground indicates that Q660 is not conducting or turning on properly. Actuation of the actuator 105 indicates that Q655 may be shorted. The test unit 610 may provide status signal 145 to indicate each of these conditions and failures.

Figure 7:
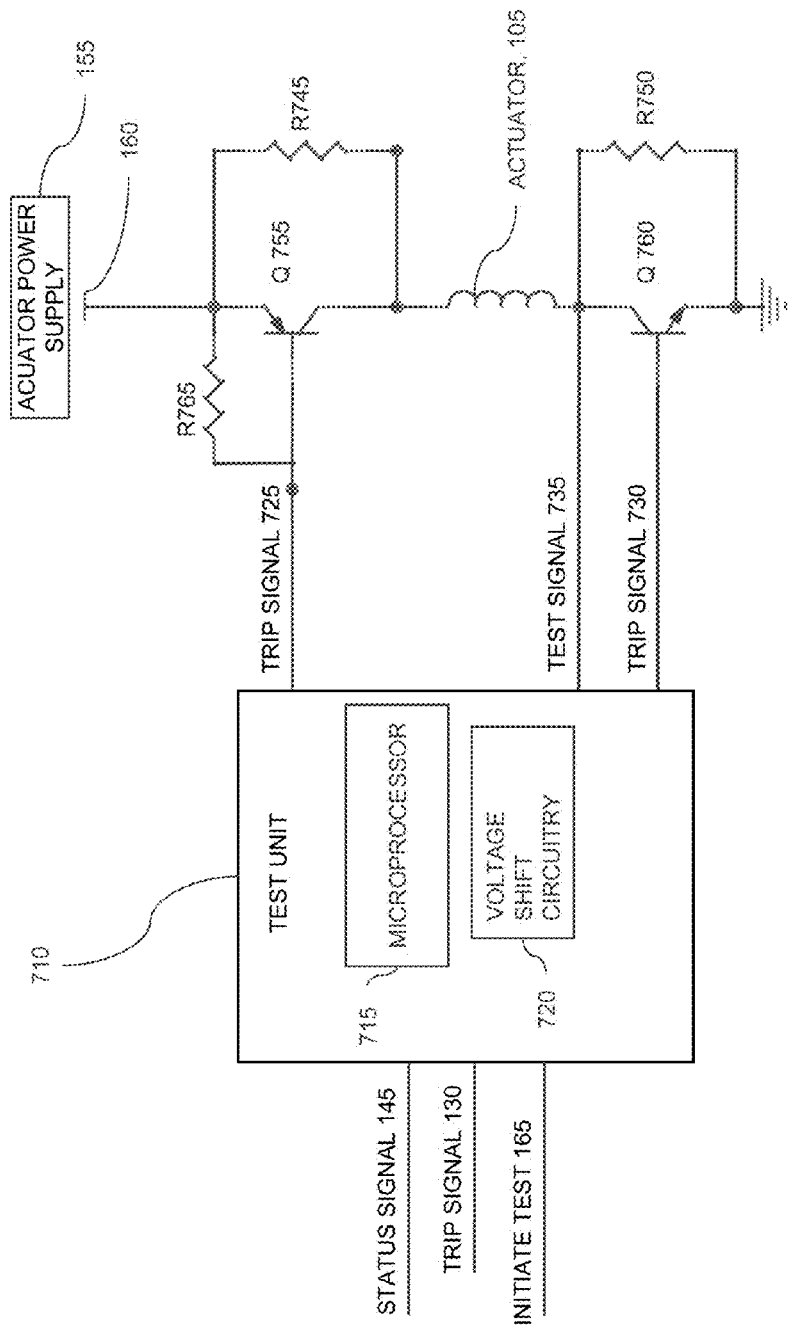

FIG. 7 shows still another embodiment of a test unit 710 and supporting circuitry for providing both a testing facility and actuator operation. Test unit 710 may include a microprocessor 715 and voltage shift circuitry 720, similar to the embodiments disclosed above, including any circuitry, components, additional processors, and memory devices with computer readable or usable media and computer readable or usable storage media encoded with computer executable components, software, programs, instructions, commands, etc. for implementing the embodiments disclosed herein. Test unit 710 may be configured to perform tests automatically or in response to the initiate test signal 165 described above. Similar to the other embodiments described herein, the values of resistor 745 and resistor 750 may be selected such that current through any one of them is not sufficient to actuate actuator 105. Q755 and Q760 may be any switch, switching device, or switching circuitry suitable for energizing the actuator 105.

When the test unit 710 has not been enabled for testing, the test unit may operate to turn on both Q755 and Q760 in response to the trip signal 630, actuating the actuator 105 and causing the circuit breaker to trip. For testing the circuit breaker, test unit 710 may generally operate to provide trip signal 725 and trip signal 730 and to read or sense test signal 735. The connection to the actuator 105 may be tested by providing trip signal 725 to cause Q755 to conduct or "turn on" and providing trip signal 730 to cause Q760 to open or "turn off" and sensing test signal 735. A voltage at test signal 735 that is substantially equal to the voltage of the actuator power supply 155 indicates that the connection is present and Q755 and Q760 are operating properly. A voltage at test signal 735 that is substantially equal to ½ the voltage of the actuator power supply 155 indicates that the connection is present and Q755 may be malfunctioning. A voltage at test signal 735 of substantially 0 volts indicates that Q660 may be shorted. Under these conditions, the solenoid may actuate, tripping the circuit breaker. Further operations of Q755 and Q760 may be tested by providing trip signal 725 to cause Q755 to open or "turn off" and providing trip signal 730 to cause Q760 to close or "turn on" and sensing test signal 735. A voltage at test signal 735 that is substantially equal to 0 volts or ground indicates that Q755 and Q760 may be operating properly. A voltage at test signal 735 that does not substantially equal 0 volts or ground indicates that Q760 is not conducting or operating properly. Actuation of the actua-tor 105 indicates that Q755 may be shorted. The test unit 710 may provide status signal 145 to indicate any of these conditions or failures.

It should be understood that while the different embodiments of the test unit 125, 500, 610, 710 are described above as being separate from the electronic trip unit 120, in alternate embodiments the test unit may be part of or integrated with the electronic trip unit 120 or any other suitable part of the circuit breaker 100.

The exemplary embodiments provide for an automatic self-test of a switching device of the circuit breaker 100 without disrupting power supplied through the circuit breaker 100 to a load. In accordance with the exemplary embodiments, the connection between an actuator and the switching device is tested automatically, along with proper operation of the switching device, without energizing the circuit breaker actuator, and thus without tripping the circuit breaker.

While embodiments have been described in connection with what are presently considered to be the most practical and preferred embodiments, it is to be understood that the embodiments are not limited to those disclosed herein. Rather, the embodiments described are intended to cover all of the various modifications and equivalent arrangements included within the spirit and scope of the appended claims.

What is claimed is:
1. A circuit breaker comprising:
an actuator;
a switching device connected to the actuator;
an actuator power supply configured to provide a second actuator power supply voltage,
a test unit configured to test a connection between the actuator and the switching device by detecting a first connection voltage at the connection between the actuator and the switching device, said test unit further configured to test the operation of the switching device by turning the switching device on without operating the actuator; and
a processor configured to produce a signal indicative of a functional connection between the actuator and the switching device if the first connection voltage is less than or equal to the second actuator power supply voltage.

2. The circuit breaker of claim 1, wherein the test unit is further configured to produce a status signal indicative of an operational status of the connection between the actuator and the switching device.

3. The circuit breaker of claim 1, wherein the test unit is further configured to produce a signal indicative of the switching device operational status.

4. The circuit breaker of claim 1, wherein
the processor further configured to:
determine a third threshold voltage, and produce a signal indicative of a functional connection between the actuator and the switching device if the first connection voltage is less than or equal to the second actuator power supply voltage and is greater than or equal to the third threshold voltage.

5. The circuit breaker of claim 4, wherein the processor is further configured to produce a signal indicative of a faulty connection between the actuator and the switching device if the connection voltage is greater than the actuator power supply voltage or less than first threshold voltage.

6. The circuit breaker of claim 1, wherein
the processor is further configured to apply a trip signal to the switching device, without energizing the actuator;

circuitry configured to sense the first connection voltage at the connection between the actuator and the switching device while the trip signal is applied;
wherein the processor is further configured to:
determine a fourth threshold voltage, and
produce a signal indicative of a functional switching device if the connection voltage is less than or equal to the fourth threshold voltage while the trip signal is applied.

7. The circuit breaker of claim 6, wherein the processor is further configured to produce a signal indicative of a faulty switching device if the connection voltage is greater than the fourth threshold voltage while the trip signal is applied.

8. A method for self testing a circuit breaker having an actuator and a switching device connected to the actuator, the method comprising:
providing a second actuator power supply voltage:
turning the switching device on without operating the actuator;
testing a connection between the actuator and the switching device by detecting a first connection voltage at the connection between the actuator and the switching device; and
producing a signal indicative of a functional connection between the actuator and the switching device if the first connection voltage is less than or equal to the second actuator power supply voltage.

9. The method of claim 8, further comprising producing a status signal indicative of an operational status of the connection between the actuator and the switching device.

10. The method of claim 8, further comprising producing a status signal indicative of an operational status of the switching device.

11. The method of claim 8, further comprising:
determining a third threshold voltage; and
producing a signal indicative of a functional connection between the actuator and the switching device if the first connection voltage is less than or equal to the second actuator power supply voltage and is greater than or equal to the third threshold voltage.

12. The method of claim 11, further comprising producing a signal indicative of a faulty connection between the actuator and the switching device if the connection voltage is greater than the actuator power supply voltage or less than the first threshold voltage.

13. The method of claim 8, further comprising:
applying a trip signal to the switching device without energizing the actuator;
sensing the first connection voltage at the connection between the actuator and the switching device while the trip signal is applied;
determining a fourth threshold voltage; and
producing a signal indicative of a functional switching device if the connection voltage is less than or equal to the fourth threshold voltage while the trip signal is applied.

14. The method of claim 13, further comprising producing a signal indicative of a faulty switching device if the connection voltage is greater than the fourth threshold voltage while the trip signal is applied.

* * * * *